US012579094B2

(12) United States Patent
Teglia et al.

(10) Patent No.: US 12,579,094 B2
(45) Date of Patent: Mar. 17, 2026

(54) METHOD FOR MANAGING ACCESS BY A THREAD TO A SLAVE DEVICE

(71) Applicants:THALES DIS FRANCE SAS, Meudon (FR); THALES, Meudon (FR)

(72) Inventors: Yannick Teglia, Belcodene (FR); Jean Roch Coulon, Le Tholonet (FR); André Sintzoff, Marseilles (FR); Antoine Christin, Cesson-Sevigne (FR)

(73) Assignee: THALES DIS FRANCE SAS, Meudon (FR)

( * ) Notice: Subject to any disclaimer, the term of this patent is extended or adjusted under 35 U.S.C. 154(b) by 70 days.

(21) Appl. No.: 18/694,508

(22) PCT Filed: Sep. 20, 2022

(86) PCT No.: PCT/EP2022/076098
§ 371 (c)(1),
(2) Date: Mar. 22, 2024

(87) PCT Pub. No.: WO2023/046681
PCT Pub. Date: Mar. 30, 2023

(65) Prior Publication Data
US 2025/0045231 A1        Feb. 6, 2025

(30) Foreign Application Priority Data
Sep. 22, 2021        (EP) .................................... 21306312

(51) Int. Cl.
*G06F 13/40*                (2006.01)
(52) U.S. Cl.
CPC ...... *G06F 13/4068* (2013.01); *G06F 2213/40* (2013.01)

(58) Field of Classification Search
CPC .......................... G06F 13/4068; G06F 2213/40
See application file for complete search history.

(56) References Cited

U.S. PATENT DOCUMENTS

| | | | |
|---|---|---|---|
| 2002/0116587 A1 | 8/2002 | Modelski et al. | |
| 2002/0133586 A1* | 9/2002 | Shanklin ................ | H04L 43/06 709/224 |

(Continued)

FOREIGN PATENT DOCUMENTS

| | | |
|---|---|---|
| EP | 1217530 A2 | 6/2002 |
| WO | 20160140766 A1 | 9/2016 |

OTHER PUBLICATIONS

International Search Report (PCT/ISA/220) and Written Opinion (PCT/ISA/237) mailed on Jan. 20, 2023, by the European Patent Office as the International Searching Authority for current International Application No. PCT/EP2022/076098 [12 pages].

*Primary Examiner* — Henry Tsai
*Assistant Examiner* — Harry Z Wang

(57) ABSTRACT

The present disclosure relates to a data processing system comprising a bus interconnect structure, a slave device coupled to the bus interconnect structure, a slave protection unit coupled to the bus interconnect structure, a plurality of master devices coupled to the bus interconnect structure, each master device of said plurality of master devices having a master identifier, wherein a master device is configured to run concurrently different threads, and, when a thread run by said master device requests access to said slave device, for issuing on the bus interconnect structure an access request comprising its master identifier and a thread identifier assigned to said thread.

9 Claims, 3 Drawing Sheets

(56)  References Cited

U.S. PATENT DOCUMENTS

| | | | |
|---|---|---|---|
| 2006/0090084 | A1 | 4/2006 | Buer |
| 2011/0276735 | A1 | 11/2011 | Cho et al. |
| 2012/0047576 | A1 | 2/2012 | Do et al. |
| 2012/0072631 | A1 | 3/2012 | Chirca et al. |
| 2013/0212386 | A1* | 8/2013 | Rastogi ............... H04L 63/0471 |
| | | | 713/168 |
| 2014/0223047 | A1* | 8/2014 | Chavali ............... G06F 13/4068 |
| | | | 710/110 |
| 2016/0004647 | A1 | 1/2016 | Eppensteiner et al. |
| 2016/0098365 | A1* | 4/2016 | Bshara ................ G06F 13/4282 |
| | | | 710/313 |
| 2016/0147675 | A1 | 5/2016 | Lin et al. |
| 2019/0034628 | A1 | 1/2019 | Hall et al. |
| 2020/0250094 | A1 | 8/2020 | Waugh et al. |
| 2023/0076376 | A1* | 3/2023 | Hoel .................... H04L 63/029 |

* cited by examiner

S1 — Issuing an access request comprising MID and TID

S2 — Verifying whether access should be granted to the thread or not

S3 — Granting the thread access to the slave device

METHOD FOR MANAGING ACCESS BY A THREAD TO A SLAVE DEVICE

FIELD OF USE

The invention relates to the field of memory protection in a data processing device and more particularly to a method for filtering memory access depending on the thread requesting access to the memory.

BACKGROUND

Various security mechanisms may be embedded in data processing devices in order to prevent an attacker from accessing sensitive data stored in the data processing device or from making such a device execute malicious code.

One of such mechanisms is the control of memory access in order to restrict reading from or writing to some memory areas storing sensitive data. Such an access control on memory accesses is usually enforced by a Memory Protection Unit (MPU). Such a MPU is generally included in a master device, such as a CPU, requesting access to a memory location. By checking each access request issued by such a master device, the MPU is able to deny access when the request does not match an established access policy. Such protection units are particularly used in System-On-Chips (SoC) based on RISC-V architecture where they are called Physical Memory Protection (PMP).

A problem is that modern data processing system such as complex System-On-Chips (SoC) based on RISC-V architecture may include several master devices performing concurrent accesses to bus slave devices such as RAM or NVM. Some master devices such as unregulated CPU cores or DMA may not include any PMP, which means that these memory accesses are not filtered. An attacker may take advantage of this lack of protection and use such a PMP-less master device to access protected data in RAM or NVM, therefore thwarting the protection implemented by the PMP of regulated CPU cores.

In order to avoid such a security break a new protection mechanism has been proposed by the company Andes Technology Corporation in which memory access requests are not only filtered at the master device level by the PMP but also at the bus slave device-level by a dedicated protection unit called IOPMP. It enables to filter all the access requests coming from any master device, even the ones not including a PMP.

In order to filter access requests from the master devices, IOPMP accepts or rejects a request based on the ID of the master device that issued the access request. It enables to grant trusted master devices such as regulated CPU cores full access to the memory but to deny untrusted master devices access to sensitive portions of the memory.

A limitation of such an IOPMP system is that it applies the same policy to all the requests from a given master device based on its identity, whatever the thread executed by this master device and requesting the access. It cannot grant access to the requests emitted by legitimate threads executed by a CPU but deny the requests emitted by malicious threads executed by the same CPU.

Therefore, there is a need for a protection mechanism enabling to filter access requests to bus slave devices at a thread level.

SUMMARY

The invention aims at solving the above mentioned technical problem.

For this purpose and according to a first aspect, this invention therefore relates to a data processing system comprising:
- a bus interconnect structure,
- a slave device coupled to the bus interconnect structure,
- a slave protection unit coupled to the bus interconnect structure,
- a plurality of master devices coupled to the bus interconnect structure,
- i. each master device of said plurality of master devices having a master identifier,
- ii. wherein:
- a master device is configured to run concurrently different threads, and, when a thread run by said master device requests access to said slave device, for issuing on the bus interconnect structure an access request comprising its master identifier and a thread identifier assigned to said thread,
- the slave protection unit is configured to grant said thread access to the slave device through the bus interconnect structure after verifying that the master device issuing the request is allowed to access said slave device based on the master identifier of said master device and that the thread is allowed to access said slave device based on the thread identifier of said thread.

Such a system enables to grant or reject access to a slave device depending both on the identity of the master device issuing the request and on the identity of the thread, executed by this master device, for which the request is issued.

Said master device may be among a regulated core, unregulated core or device and a Direct Memory access device (DMA).

The thread identifier assigned to a thread may be based on a certificate of said thread.

It enables to assign an identifier to verified threads at startup of the system and to provide it to the slave protection units of the system.

The master device may execute an operating system configured to attribute a thread identifier to each thread executed by the master device.

According to a second aspect, the invention relates to a method for managing access by a thread to a slave device, said thread being run by a master device among a plurality of master devices each having a master identifier and said master device running concurrently different threads, in a data processing system according to the first aspect comprising a bus interconnect structure, said slave device, a slave protection unit and said master devices, said method comprising performed by said data processing system:
- when the thread requests access to said slave device, issuing by the master device on the bus interconnect structure an access request comprising its master identifier and a thread identifier assigned to said thread,
- verifying, by the slave protection unit, that the master device issuing the request is allowed to access said slave device based on the master identifier of said master device and that the thread is allowed to access said slave device based on the thread identifier of said thread,
- if verification is successful, granting, by the slave protection unit, said thread access to the slave device through the bus interconnect structure.

The slave protection unit may deny a thread access to the slave device when a number of accesses by said thread to the slave device in a given timeframe gets above a predetermined threshold.

It enables to dynamically update lists of approved or banned threads when a suspicious behavior is detected.

The slave device may prevent further accesses by the thread, either temporarily, or until a third party grant is received or forever.

By doing so, resources of a slave device may be protected over an extended time period.

In an embodiment wherein the master device executes an operating system, the method according to the second aspect may comprise attributing by said operating system a thread identifier to each thread executed by the master device.

According to a third aspect, the invention relates to a computer program product directly loadable into the memory of at least one computer, comprising software code instructions for performing the steps of the method according to the second aspect, when said computer program product is run on the at least one computer.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION

The invention aims at filtering at a thread level access requests to slave devices in a data processing system 10.

Figure 1:
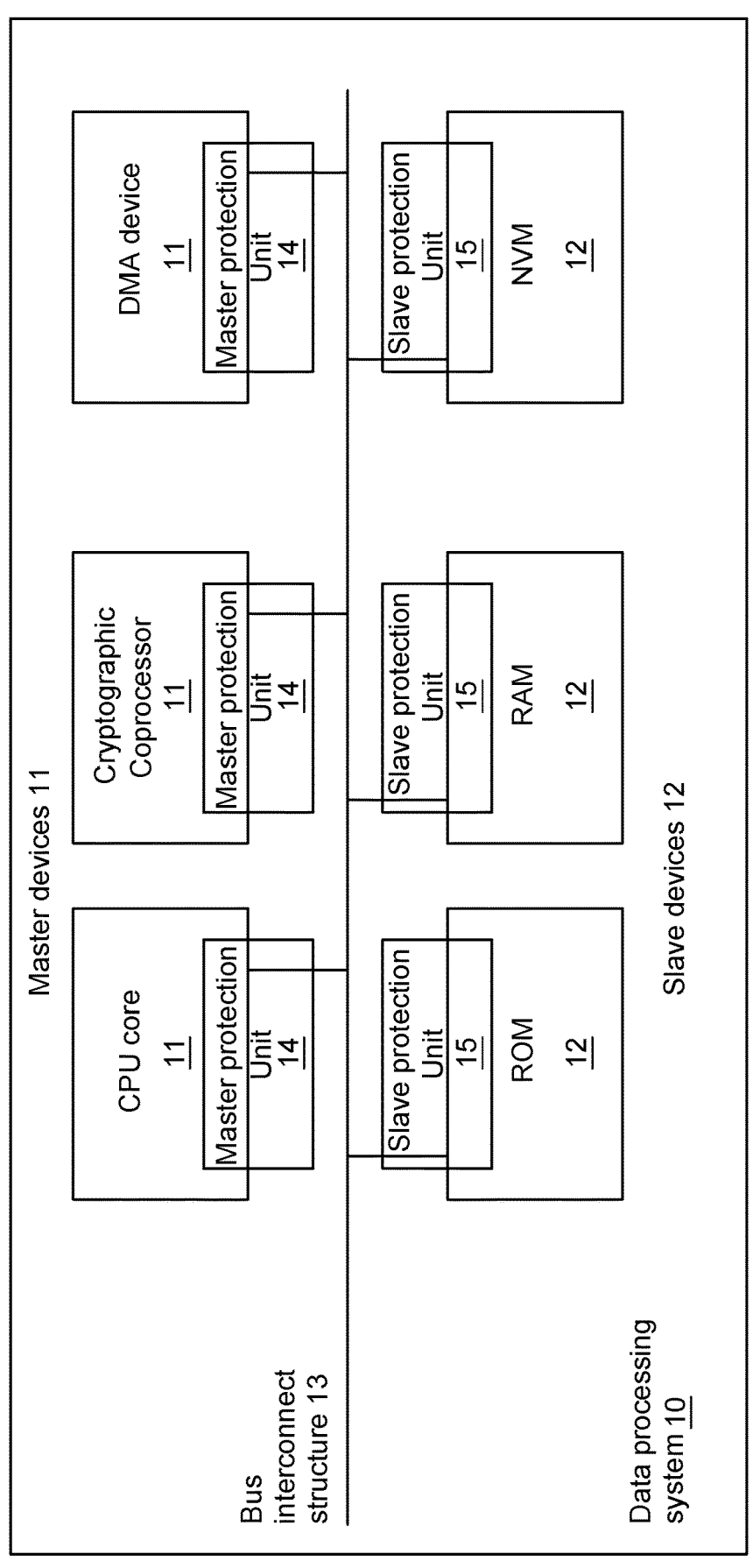
FIG. 1 depicts schematically an example of a data processing system according to the present invention.

As shown on FIG. 1, the data processing system 10 includes a plurality of master devices 11 and at least one slave device 12. Such a data processing system may be any computer device comprising multiple master devices. It may for example be a Personal Computer or a server comprising multiple execution units such as a multi-core CPU or multiple CPUs. It may be a System on Chip (SoC). Master devices may for example be regulated or unregulated CPU cores, a GPU (Graphics Processing Unit), a TPU (Tensor Processing Unit), any other coprocessor or a DMA (Direct Memory Access) device. Slave devices may for example be a RAM memory, a ROM memory or a NVM memory, or coprocessors such as a cryptographic coprocessor, a GPU (Graphics Processing Unit) or a TPU (Tensor Processing Unit).

The data processing system 10 also includes a bus interconnect structure 13 coupling the master devices and the slave devices.

The data processing system 10 also includes at least one master protection unit 14 and at least one slave protection unit 15 connected to the bus interconnect structure. In a first embodiment shown on FIG. 1, the data processing device includes one master protection unit for each master device and one slave protection unit for each slave device of the system. In such a case, the master/slave protection unit of a master device/slave device may be included in the master device/slave device or located between the master device/ slave device and the bus interconnect structure. In another embodiment, the system may comprise a master protection unit for a group of master devices, located between these master devices and all the slave protection units, and/or a slave protection unit for a group of slave devices, located between these slave devices and all the master protection units. In such a case, a single chip may even play the role of both master protection unit and slave protection unit.

In the following paragraphs, the expression "master device" may be used to designate the master device itself and its associated master protection unit even when this master protection unit is not included in the master device itself.

In order to enable a filtering of access requests from the master devices to a slave device at a thread level, the main idea of the invention is to include in each access request both an identifier of the master device issuing the request and an identifier of the thread executed by this master device and issuing the request. Based on these identifiers, the slave protection unit of the slave device can then grant or deny access to the slave device depending on the compliance of both the master device and the thread with a security policy.

In order to do so, each master device has a master identifier MID. Such an identifier may for example be permanently assigned to each of the master devices by a secure boot process executed by a secure boot loader at the startup of the data processing system.

In addition, each master device may assign a thread identifier TID to each thread it executes. When a secure boot is performed, the secure boot loader may authenticate each program to be run by a master device before loading it into a RAM memory of the data processing system. Such an authentication may be performed by making the secure boot loader verify certificates of the programs. In such a case, the TID assigned to each thread may be based on the certificate of the corresponding program. For example, the TID may be equal to a certificate ID generated by the secure boot loader for the program.

In the case of master devices being CPU or CPU cores, such master devices may execute an operating system (OS). In such a case, it is the OS that assigns a TID to each thread executed in the frame of the OS.

In the case of a master device without processor, the master device executes one thread at a time. In such a case, the master protection unit of the master device may insert in the request issued by the master device a default thread identifier.

Figure 2:
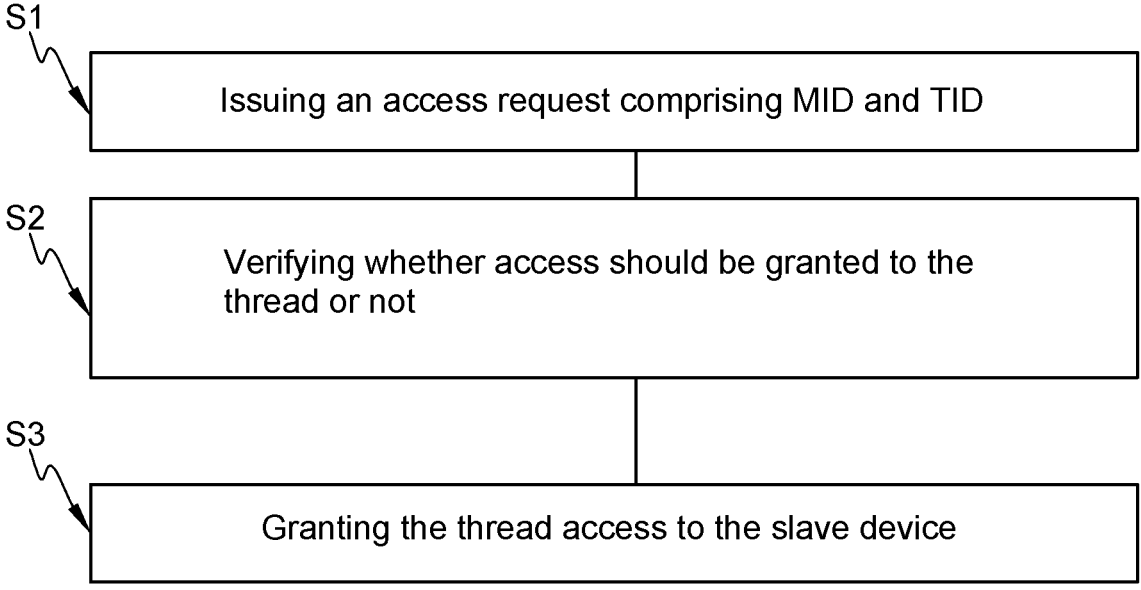
FIG. 2 is a schematic illustration of a method for managing access by a thread executed by a master device to a slave device according to an embodiment of the present invention.

The following paragraphs and FIG. 2, describe the steps of a method for managing access by a thread executed by a master device to a slave device, according to the invention.

In a request step S1, when the thread requests access to the slave device 12, the master device 11 issues on the bus interconnect structure an access request comprising its master identifier MID and a thread identifier TID assigned to the thread. The master device may provide the request comprising the TID of the thread to the master protection unit 14 which may insert in the request the MID of the master device. For example the MID and the TID may be concatenated to form the request, which is then broadcasted on the bus interconnect structure towards the slave device and its slave protection unit 15.

In a verification step S2, the slave protection unit 15 of the slave device may perform multiple verifications in order to check whether access should be granted to the thread or not.

Firstly, the slave protection unit may verify that the master device issuing the request is allowed to access said slave device based on the master identifier of said master device.

By doing so, the master device can reject the request when it has been issued by a master device that is never allowed to access the slave device.

Secondly, the slave protection unit may verify that the thread is allowed to access said slave device based on the thread identifier of said thread.

For example, the slave protection memory may store a white list of both MIDs and TIDs authorized to access the slave device and it may compare the MID and TID of the request to this white list. Similarly, the slave protection unit may store a black list of MIDs and/or TIDs forbidden to access the slave device.

In an embodiment, the same MID/TID may be assigned to all the secure master devices/threads authorized to access the slave device, so that the slave protection unit grants the thread access when it shows this pre-approved MID/TID.

Alternatively, approved MIDs and TIDs can be stored in a register of the slave protection unit. This register can be written by the secure boot loader when the system is initialized, after verifying the certificates of the threads. It can also be updated dynamically by a trusted third party providing legitimate TIDs for a given period of time, based on history during past time periods. Such a dynamic update may be used to remove a MID from the list of approved MIDs and therefore prevent any further access by any thread executed by the master device having this MID.

Figure 3:
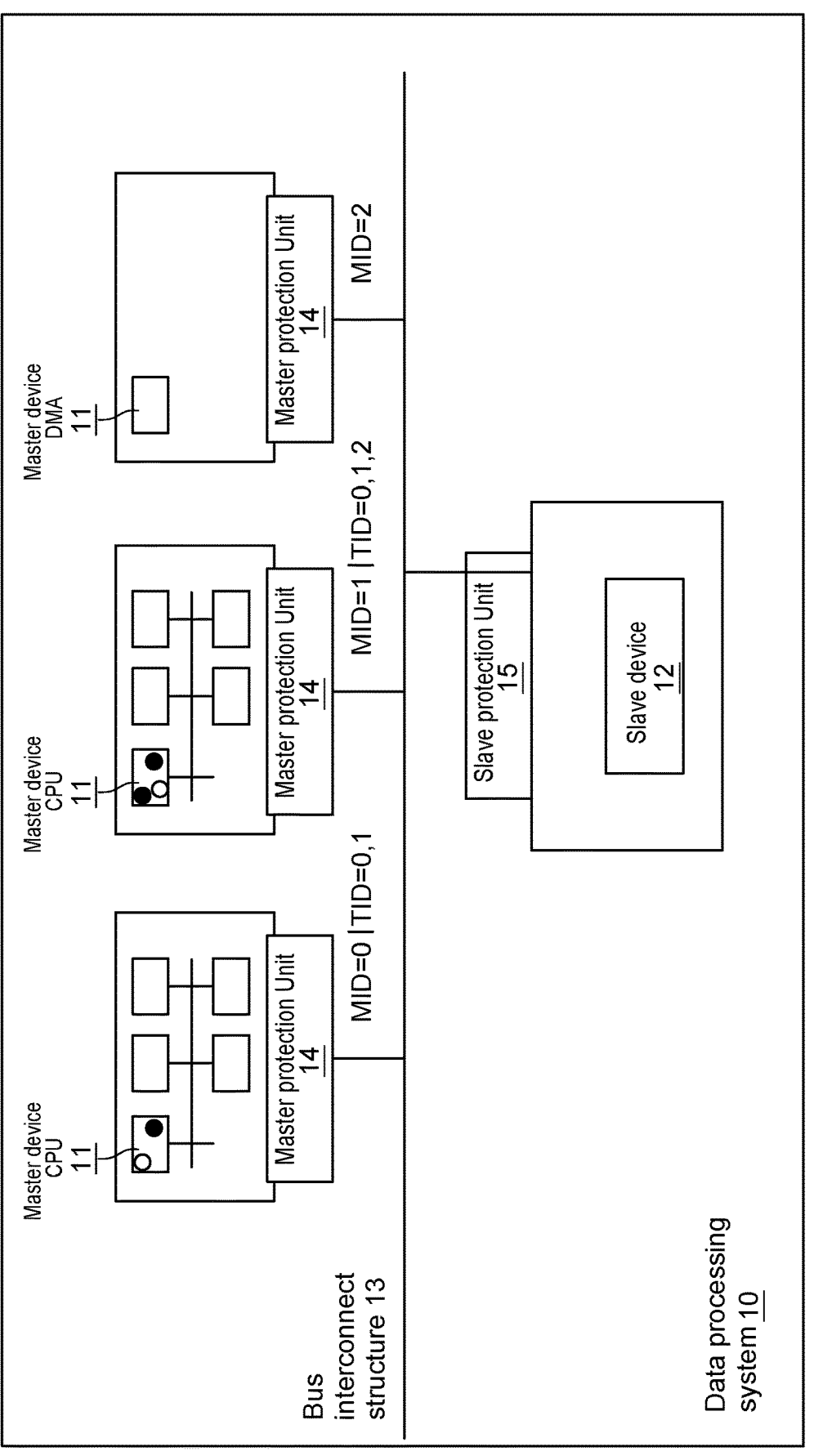
FIG. 3 depicts schematically is a schematic illustration of an example of management access by threads executed by three different master device to a slave device according to an embodiment of the invention.

An example is given on FIG. 3, in which three different master devices may send requests for access to a slave device. They have been assigned MIDs 0, 1 and 2. The first master device, with MID=0, runs two threads with TIDs 0 and 1. The second master device, with MID=1, runs three threads with TIDs 0, 1 and 2. As an example, the slave protection unit of the slave device may grant access only to the second thread of the first master device (MID=0, TID=1) and to the first and second threads of the second master device (MID=1, TID=0 and 1). On the contrary, it may reject any request from the first thread of the first master device (MID=0, TID=0), from the third thread of the second master device (MID=1, TID=2) or from any thread of the third master device (MID=2, whatever the TID).

The slave protection unit may enforce additional security policies. For example, the slave protection unit may deny a thread access to the slave device when a number of accesses by said thread to the slave device in a given timeframe gets above a predetermined threshold. Such repeated accesses to the slave device at high frequency may indeed be seen as a suspicious behavior, showing an ongoing attack on the data processing device.

Similarly, the slave protection unit may deny a thread access to the slave device when it detects any other kind of suspicious behavior, for example when the request has an abnormal format or content.

In order to enhance the protection of the slave device against an ongoing attack aiming at accessing the slave device resources, the slave device may not only reject the current request but also extends the time for which requests by the same master device and/or thread will be rejected. The slave protection unit may prevent further accesses by the master device or the thread, either temporarily, or until a third party grant is received or forever.

Finally, in a granting step S3, if verifications performed at the verification step S2 have been successful, the slave protection unit grants the requesting thread access to the slave device through the bus interconnect structure.

As a result, the system and method described above enable to grant or reject access to a slave device depending both on the identity of the master device issuing the request and on the identity of the thread, executed by this master device, for which the request is issued. Such a finer grained filtering may prevent different threads executed by the same master device or even threads executed by different master devices to spy on each other by accessing shared resources on slave devices. It also enables a finer management of the resources on the slave side.

The invention claimed is:

1. A data processing system comprising:
a bus interconnect structure,
a slave device coupled to the bus interconnect structure,
a slave protection unit coupled to the bus interconnect structure,
a plurality of master devices coupled to the bus interconnect structure, and
each master device of said plurality of master devices having a master identifier,
wherein a master device is configured to run concurrently different threads, and, when a thread run by said master device requests access to said slave device, for issuing on the bus interconnect structure an access request comprising its master identifier and a thread identifier assigned to said thread, and
the slave protection unit is configured to grant said thread access to the slave device through the bus interconnect structure after verifying that the master device issuing the request is allowed to access said slave device based on the master identifier of said master device and that the thread is allowed to access said slave device based on the thread identifier of said thread.

2. The data processing system of claim 1, wherein said master device is among a regulated core, unregulated core or device and a Direct Memory Access device.

3. The data processing system of claim 1, wherein the thread identifier assigned to a thread is based on a certificate of said thread.

4. The data processing system of claim 1, wherein, the master device executes an operating system configured to attribute a thread identifier to each thread executed by the master device.

5. A method for managing access by a thread to a slave device, said thread being run by a master device among a plurality of master devices each having a master identifier and said master device running concurrently different threads, in a data processing system of claim 1 comprising a bus interconnect structure, said slave device, a slave protection unit and said master devices, said method comprising performed by said data processing system:
when the thread requests access to said slave device, issuing by the master device on the bus interconnect structure an access request comprising its master identifier and a thread identifier assigned to said thread,
verifying, by the slave protection unit, that the master device issuing the request is allowed to access said slave device based on the master identifier of said master device and that the thread is allowed to access said slave device based on the thread identifier of said thread, and
if verification is successful, granting, by the slave protection unit, said thread access to the slave device through the bus interconnect structure.

6. The method of claim 5, wherein the slave protection unit denies a thread access to the slave device when a number of accesses by said thread to the slave device in a given timeframe gets above a predetermined threshold.

7. The method of claim 6, wherein the slave device prevents further accesses by the thread, either temporarily, or until a third party grant is received or forever.

8. The method of claim 5, wherein the master device executes an operating system and comprising attributing by said operating system a thread identifier to each thread executed by the master device.

9. A computer program product directly loadable into the memory of at least one computer, comprising the at least one computer and software code instructions for performing the steps of claim 5, when said computer program product is run on the at least one computer.

\* \* \* \* \*